United States Patent
Robinson

(10) Patent No.: US 7,134,721 B2
(45) Date of Patent: Nov. 14, 2006

(54) VEHICLE SEAT WITH DUAL INDEPENDENTLY ADJUSTABLE SUPPORTS

(76) Inventor: Garry Robinson, P.O. Box 53, Louis Creek British Columbia V0E 2E0 (CA)

( * ) Notice: Subject to any disclaimer, the term of this patent is extended or adjusted under 35 U.S.C. 154(b) by 152 days.

(21) Appl. No.: 10/836,212

(22) Filed: May 3, 2004

(65) Prior Publication Data
US 2005/0116516 A1 Jun. 2, 2005

(30) Foreign Application Priority Data
Nov. 27, 2003 (CA) ................... 2449382

(51) Int. Cl.
A47C 3/025 (2006.01)
(52) U.S. Cl. ............... 297/284.3; 297/284.11; 297/DIG. 3; 297/486; 297/487
(58) Field of Classification Search ........... 297/284.1, 297/284.3, 284.11, 344.16, 344.15, 486, 487; 248/421
See application file for complete search history.

(56) References Cited

U.S. PATENT DOCUMENTS

| | | | |
|---|---|---|---|
| 4,401,343 A * | 8/1983 | Schmidt ............ 297/284.1 |
| 4,960,304 A | 10/1990 | Frantz | |
| 4,965,899 A | 10/1990 | Sekido et al. | |
| 5,263,765 A | 11/1993 | Nagashima et al. | |
| 5,283,735 A | 2/1994 | Gross et al. | |
| 5,320,409 A | 6/1994 | Katoh et al. | |
| 5,447,356 A * | 9/1995 | Snijders ............ 297/284.3 |
| 5,536,067 A * | 7/1996 | Pinto ............ 297/284.11 |
| 5,651,585 A * | 7/1997 | Van Duser ............ 297/344.16 |
| 5,975,629 A | 11/1999 | Lorbiecki | |
| 5,984,411 A * | 11/1999 | Galumbeck ............ 297/344.15 |
| 6,036,271 A * | 3/2000 | Wilkinson et al. ..... 297/452.41 |
| 6,088,643 A | 7/2000 | Long et al. | |
| 6,098,000 A | 8/2000 | Long et al. | |
| 6,109,691 A * | 8/2000 | Gray et al. ............ 297/216.17 |
| 6,155,642 A * | 12/2000 | Kawakami et al. .... 297/344.16 |
| 2004/0251725 A1* | 12/2004 | Jenkins ............ 297/344.16 |

* cited by examiner

*Primary Examiner*—Milton Nelson, Jr.
(74) *Attorney, Agent, or Firm*—Antony C. Edwards

(57) ABSTRACT

A vehicle seat, which provides an enhanced level of comfort, by the use of dual independently supported seat cushions is disclosed. The apparatus comprises an inner seat cushion and an outer seat cushion, each of which is independently supported by a compressed air pneumatic device to control vertical movement, and by parallelogram linkages control lateral movement, and allow for vertical transition of the seats while maintaining them horizontal. The occupant of this vehicle seat can independently adjust the distribution of body weight shared by the inner seat cushion and the outer seat cushion from time to time, in order to change the pressure pattern against body parts and to provide optimum ergonomic seating posture. Furthermore, by adjusting the air supply, the occupant can increase or decrease the seat's effective spring rate, thus controlling the ride height and the seat's compliance for travel on both rough terrain and smooth roadways.

19 Claims, 11 Drawing Sheets

VEHICLE SEAT WITH DUAL INDEPENDENTLY ADJUSTABLE SUPPORTS

FIELD OF THE INVENTION

The present invention relates to a vehicle seat constructed with two separate seat cushions, wherein each seat cushion is supported in a generally vertical direction by compressed air, and each cushion is supported laterally in both the fore and aft direction, and in the side to side direction, by mechanical means. One seat cushion, hereinafter referred to as the "inner seat cushion", is shaped and positioned to support the occupant's pelvic area directly below the base of the spine. The other seat cushion, hereinafter referred to as the "outer seat cushion", is shaped and positioned to support the backside of the occupant's thighs and the outer areas of the buttocks. A control valve in the air supply line to each cushion permits the occupant to regulate the height of each cushion independently from the other cushion. Furthermore, the outer cushion may be mounted on an adjustable substructure attached to the outer cushion support means so as to permit the occupant to vary the amount of support to the lower thighs provided by the outer seat cushion.

BACKGROUND OF THE INVENTION

In the prior art, it is common practice for heavy duty vehicle seats to be constructed on a sub-base with a pivoted parallelogram linkage and a compressed air actuator supporting the seat cushion in position above a fixed base, and with an adjusting valve to regulate the air supply to the air actuator, thereby permitting the occupant of the seat to adjust the ride height of the seat. Such prior art vehicle seats as described above provide a wide range of height adjustment, and the ability to absorb much more of the energy from severe jolts than is possible with a simple rigid seat with foam padding or with air bladder style seat cushions. Operators of trucks and off-highway mobile equipment are required to spend many hours each working day subjected to continual bouncing and vibration, while in a sitting position, resulting in a high incidence of related injuries such as chronic lower back pain and circulatory deficiencies among such workers. In a seated posture, the occupant's body weight is centered over the pelvis, while the legs extend laterally forward of the torso. The pressure between the seat cushions and the driver's body is distributed most predominantly in the area of the pelvis, thus transmitting most of the seating pressure directly through the pelvis directly into the spine. As seat cushions conform to the shape of the occupant's body parts, which are in supportive contact with the seat cushions, there is a reduction of blood circulation in those areas, and fatigue in the joints such as the lower vertebrae, which are subjected to continual compression. Furthermore, because the body weight is supported mainly through the pelvis, the weight of the occupant's legs and lower torso adds to the total weight supported by the base of the spine.

In the prior art, various seats with a plurality of portions which can be varied with respect to form and hardness have been proposed. Such seats are disclosed in U.S. Pat. No. 5,263,765, Hideyuki Nagashima, and U.S. Pat. No. 5,320,409, Kazuhito Katoh, in which a plurality of inflatable bladders are strategically positioned within the seat and are selectively inflated and deflated under the control of a fatigue sensing means. Such seats could offer relief from fatigue caused by continual seat pressure and vibration, but they do not address the absorption of large impacts related to vehicle operation on bumpy terrain and highways.

SUMMARY OF THE INVENTION

The apparatus of the present invention constitutes an improvement over the prior art by permitting the occupant of the seat to adjust the pressure distribution of the seat against the occupant's body parts from time to time, while maintaining the soft ride characteristics of a pivoted linkage type of seat. In a preferred embodiment of the present invention, hereinafter alternatively referred to as a "dual ride seat", an inner seat including its cushion is mounted on a first sub-base supported by a first air actuator, and retained laterally by a lower parallelogram linkage configured so that by adding air into the first air actuator, the inner seat including its cushion and the outer seat including its cushion are caused to rise approximately vertically with respect to the vehicle floor. The pressure of the air in the first air actuator is adjusted manually to balance the weight of the occupant plus the two cushion assemblies at a ride height of the occupant's choosing. The inner seat and cushion is shaped and positioned to support the pelvic area directly below the base of the spine of a person sitting on the seat. An outer seat and its cushion is mounted on a second sub-base supported by a second air actuator, and retained laterally by an upper parallelogram linkage configured so that by adding air into the second air actuator, the outer seat and cushion is caused to rise approximately vertically with respect to the inner seat and cushion. The pressure of the air in the second air actuator is adjusted manually to change the amount of the occupant's weight supported by the outer seat and its cushion assembly. The outer seat and its cushion is shaped and positioned to support the backside of the thighs and the outer areas of the buttocks of the occupant. By manually adjusting the ride height of the outer cushion with respect to the inner cushion, the occupant can change the pressure distribution from completely supported by the inner cushion against the pelvis and consequently directly through the base of the spine, to completely supported by the thighs and outer buttock areas and indirectly to the spine through the hips.

When the body is supported solely by the outer cushion, the weight of the legs and lower torso is taken directly through the seat, thus reducing the load transmitted through the pelvis and the lower spine, and the upper body weight is supported in a more naturally balanced manner through the hips. When the body is supported solely by the outer cushion, the effective spring rate of the seat system is reduced to approximately one half of that of a single seat system, due to the arrangement of two air actuators acting in tandem. A damping device such as a hydraulic shock absorber may be connected between the base and either of the seat sub-bases so as to dampen repetitive oscillations of the seat cushions in the vertical direction. The provision for independent height adjustment of the outer cushion with respect to the inner cushion from time to time, permits the occupant to re-distribute the seat pressure so as to allow blood circulation to be maintained more properly, and to vary the load pattern in the joints and in the lower vertebrae. Furthermore, the outer cushion may be mounted on a pivoted plate with an adjusting means to vary the amount of support provided to the lower thighs.

The present invention may thus offer the following advantages over prior art:

a) The ability to support the occupant's body weight entirely through the thighs and outer areas of the buttocks, with provision to adjustably support a portion or all of the body weight directly through the pelvis and base of the spine.

b) The ability to maintain good blood circulation in the body parts which are in supportive contact with the seat, by redistributing support pressure from time to time.

c) The ability to reduce long term joint fatigue in the lower back and pelvic areas, by redistributing support pressure from time to time.

d) The ability to absorb more impact energy caused by travel over rough terrain than prior art seats may offer, by means of a lower effective spring rate of the seat system, utilizing an arrangement of two air actuators acting in tandem to support the outer seat cushion.

In summary, the present invention is a vehicle seat with dual independently adjustable supports including an inner seat disposed for supporting the lower spine and adjacent inner buttocks region of a user sitting in the vehicle seat and an outer seat having a generally U-shape when viewed in plan form and mounted so as to surround the inner seat, disposed so as to support the thighs and outer buttocks region of the user. Means are mounted to the inner seat for selectively raising and lowering the inner seat. Means are mounted to the outer seat for selectively raising and lowering the outer seat. Horizontal stabilizing means horizontally stabilize vertical movement of the inner and outer seat. Control means cooperate with the means mounted to the inner seat for selectively raising and lowering the inner seat, for controlling the vertical position of the inner seat. Control means cooperate with the means mounted to the outer seat for selectively raising and lowering the outer seat, for controlling the vertical position of the outer seat. Support means are mounted to a support base for supporting the means mounted to the inner seat and the means mounted to the outer seat for selectively raising and lowering the inner and outer seats respectively. The means mounted to the inner and outer seats for selectively raising and lowering the inner and outer seats respectively serve as a pair of resilient means acting in tandem to resiliently support the inner and outer seats.

The inner and outer seats may be mounted on inner and outer sub-plates respectively. In one embodiment the outer sub-plate is pivotally mounted to an outer seat platform. A pivot angle of the outer sub-plate is adjusted by an adjusting means which may include at least one cam mounted on a rotatable pivot shaft mounted to the outer seat platform. The cam in such an embodiment may have an array of flat faces thereon such that the adjustable sub-plate is supported at any one time by one flat face of the cam. Each flat face of the array of flat faces of the cam provides for a different the pivot angle for the adjustable sub-plate.

An adjustable resilient support may be mounted to the inner seat and/or the outer seat. The spring support may include an air actuator, which may itself include an air spring. The air actuator may be mounted so as to act between the support base and the inner seat such that the inner seat is raised with respect to the support base when the air actuator is extended, or may be mounted so as to act between the inner seat and the outer seat such that the outer seat is raised with respect to the inner seat when the air actuator is extended, or may be mounted so as to act between the support base and the outer seat such that the outer seat is raised with respect to the support base when the air actuator is extended. Resiliently damping shock absorbers may be mounted so as to act between the support base and the outer seat, and between the support base and the inner seat.

The stabilizing device may include a first parallelogram linkage of pivotally mounted arms so as to allow the inner seat to remain substantially horizontal as it moves in an arc determined by the pivoting of the first parallelogram, where a first end of the first parallelogram is pivotally mounted to the support base, and an opposite second end of the parallelogram is pivotally mounted to the inner seat. The stabilizing device may also include a second parallelogram linkage of pivotally mounted arms so as to allow the outer seat to remain substantially horizontal as it moves in an arc determined by the pivoting of the second parallelogram, where a first end of the second parallelogram is pivotally mounted to the outer seat, and an opposite second end of second parallelogram is pivotally mounted to either the inner seat or the support base.

The inner and outer seat may include a seat cushion having at least one inflatable bladder element.

BRIEF DESCRIPTION OF THE DRAWINGS

The invention will be better understood by reference to the accompanying drawings, wherein.

DETAILED DESCRIPTION OF EMBODIMENTS OF THE INVENTION

Figure 1:
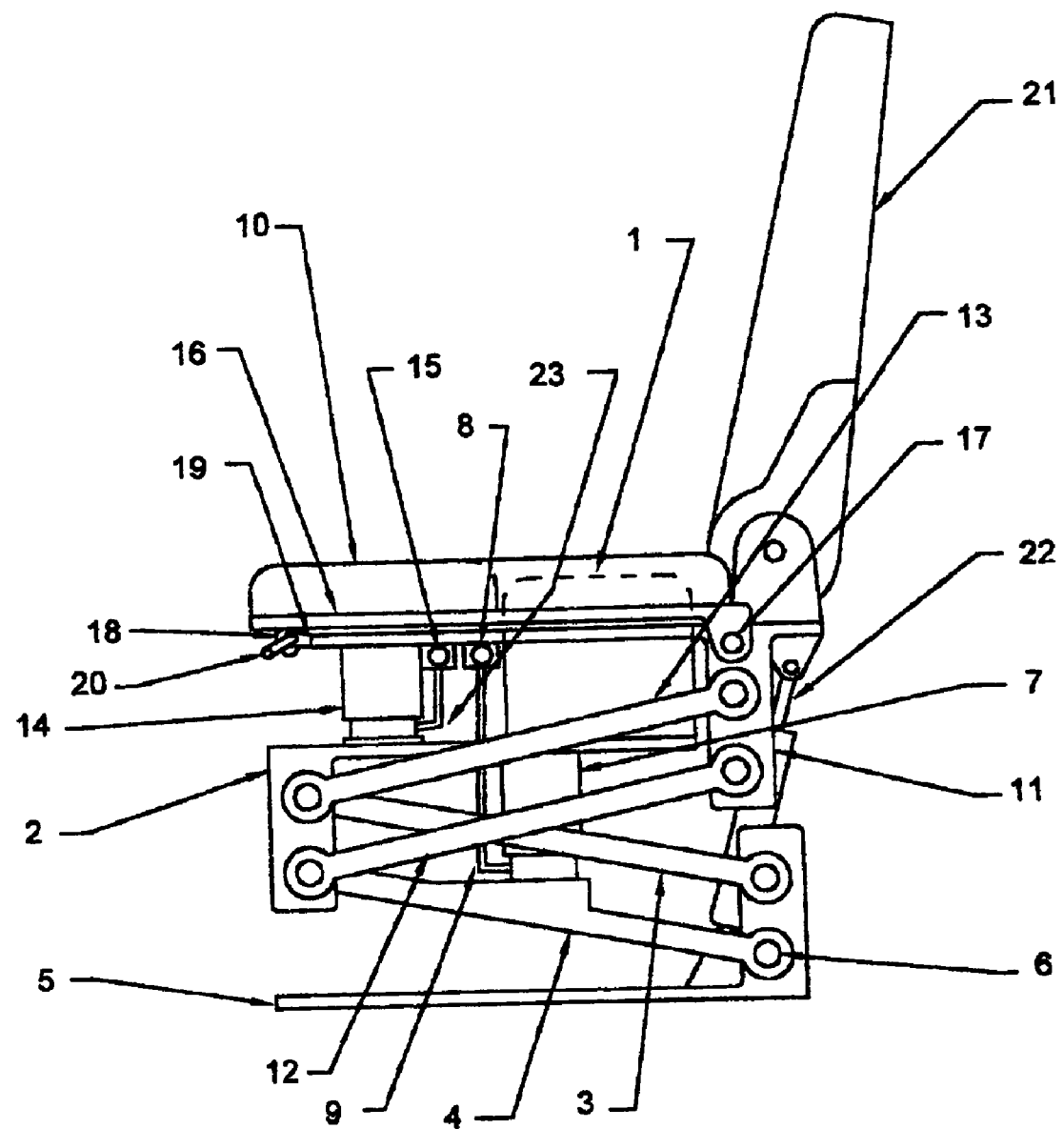
FIG. 1 depicts in right side an elevation view a dual ride seat apparatus according to a preferred embodiment of the present invention.
Figure 2:
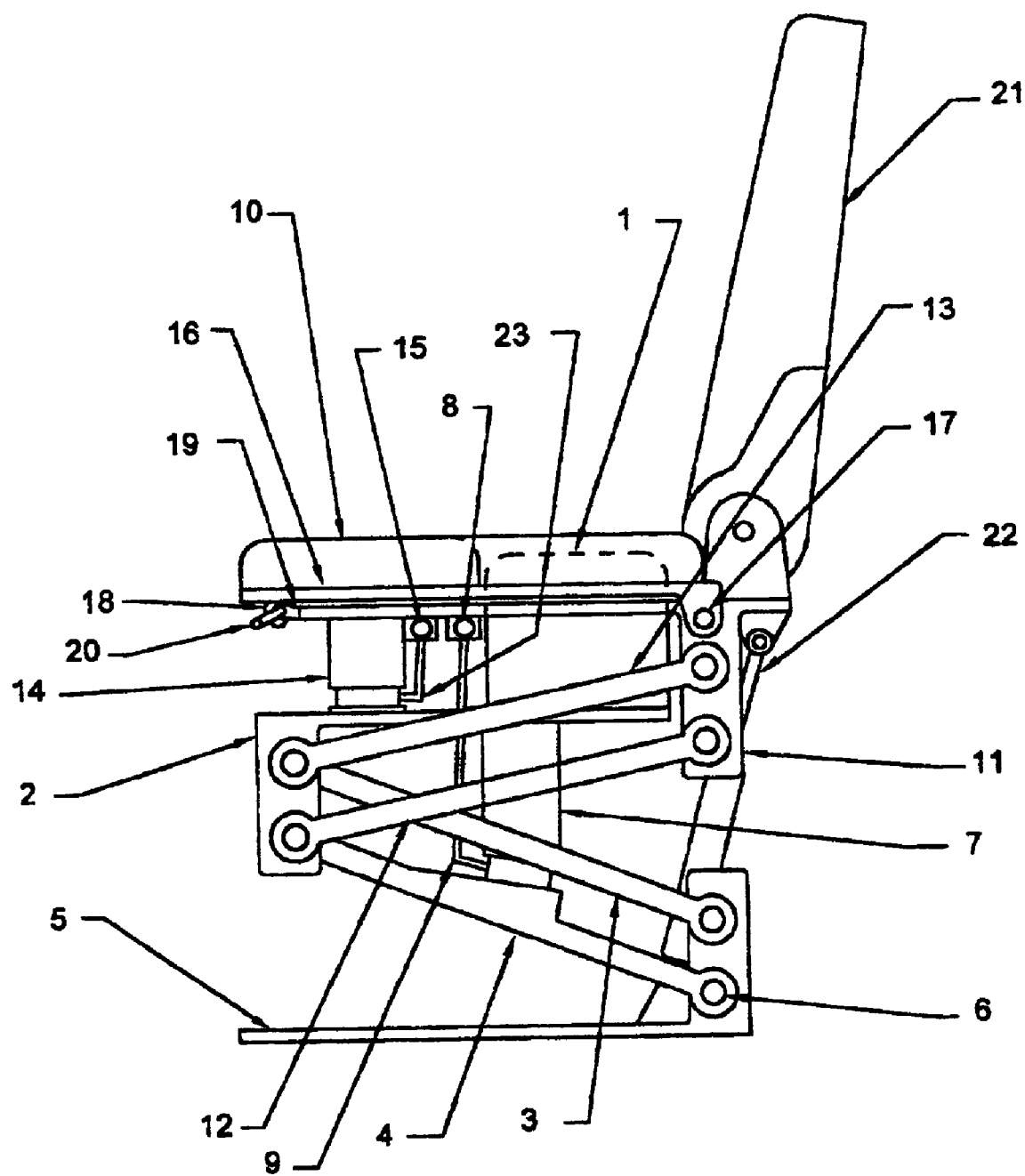
FIG. 2 is a right side elevation view as in FIG. 1, depicting the seat in a first raised position.
Figure 3:
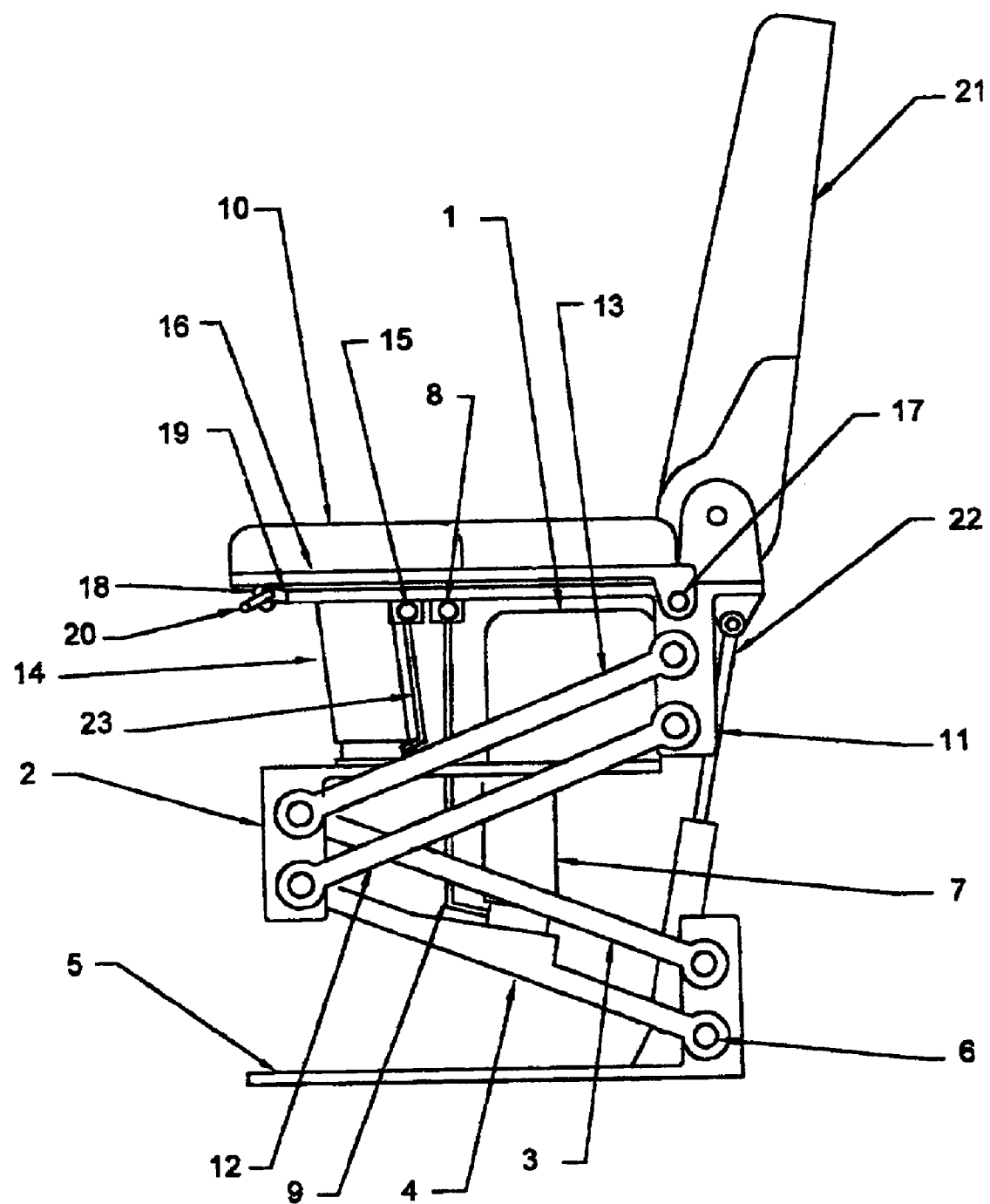
FIG. 3 is a right side elevation view as in FIG. 1, depicting the seat in a second raised position.
Figure 4:
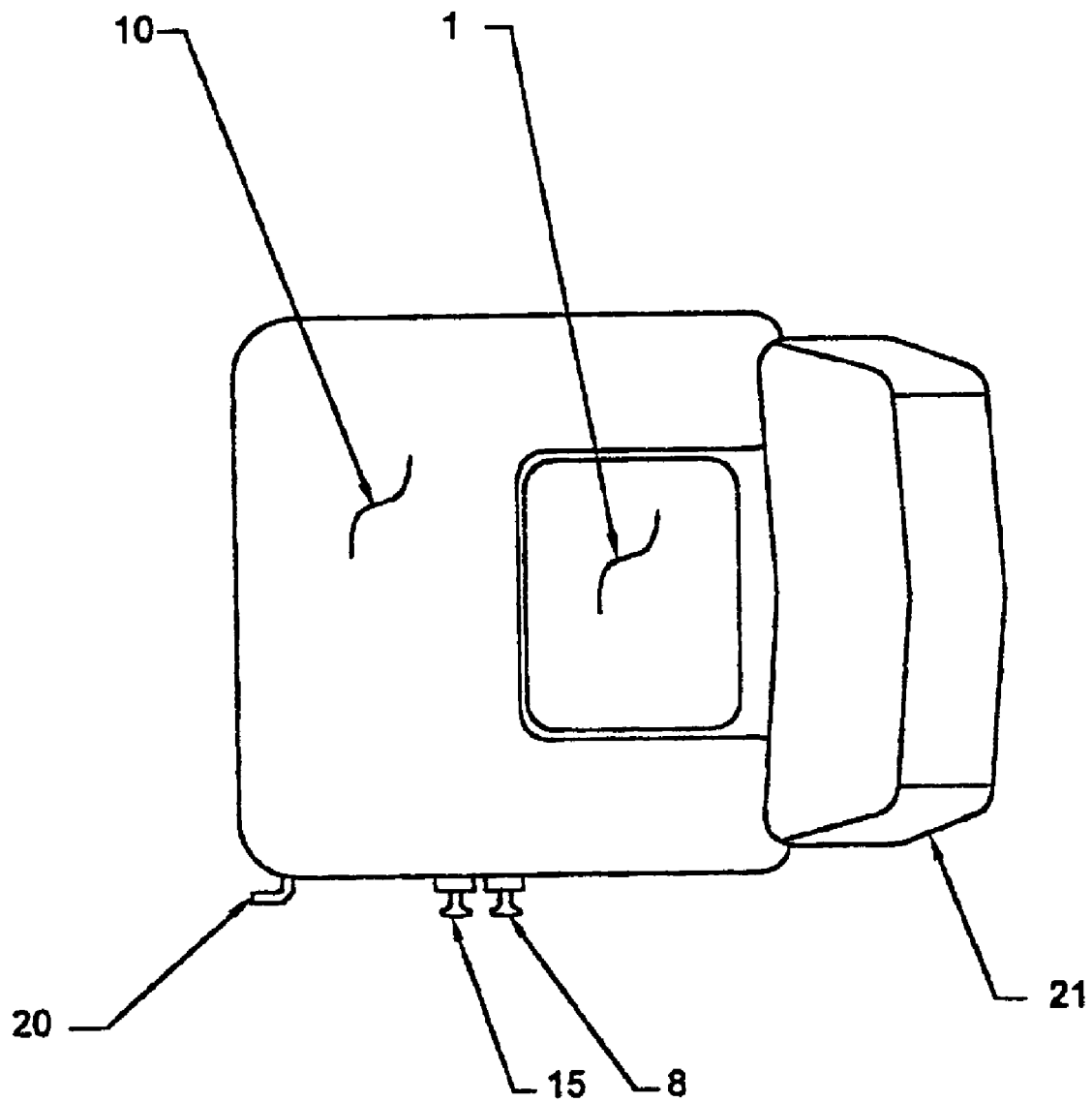
FIG. 4 is a plan view of the seat of FIG. 1, depicting the layout of the seat cushions.
Figure 5:
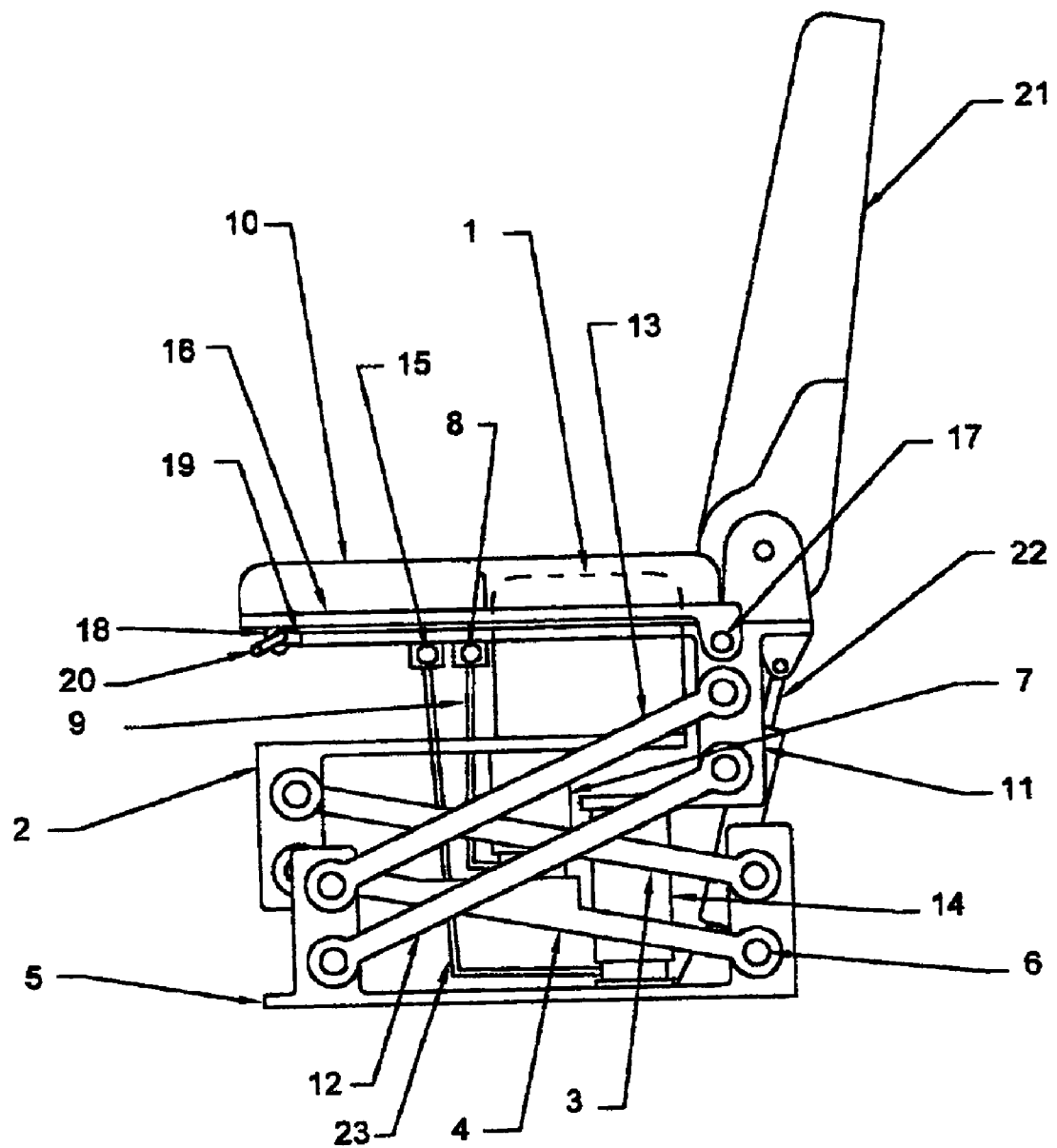
FIG. 5 is a right side elevation view according to a second preferred embodiment of the dual ride seat of the present invention.
Figure 6:
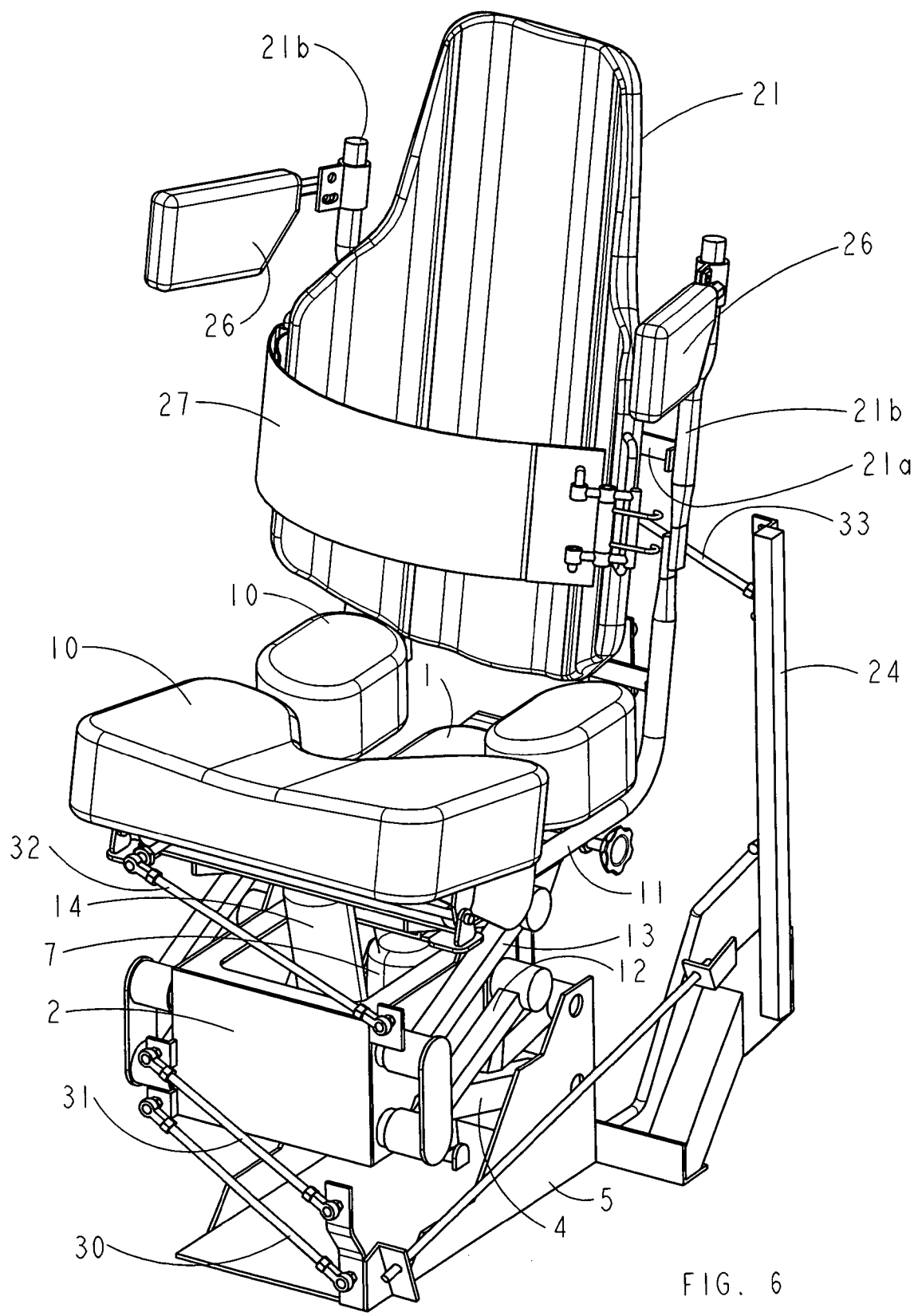
FIG. 6 is, in front perspective view, a further embodiment of the seat of FIG. 1.
Figure 7:
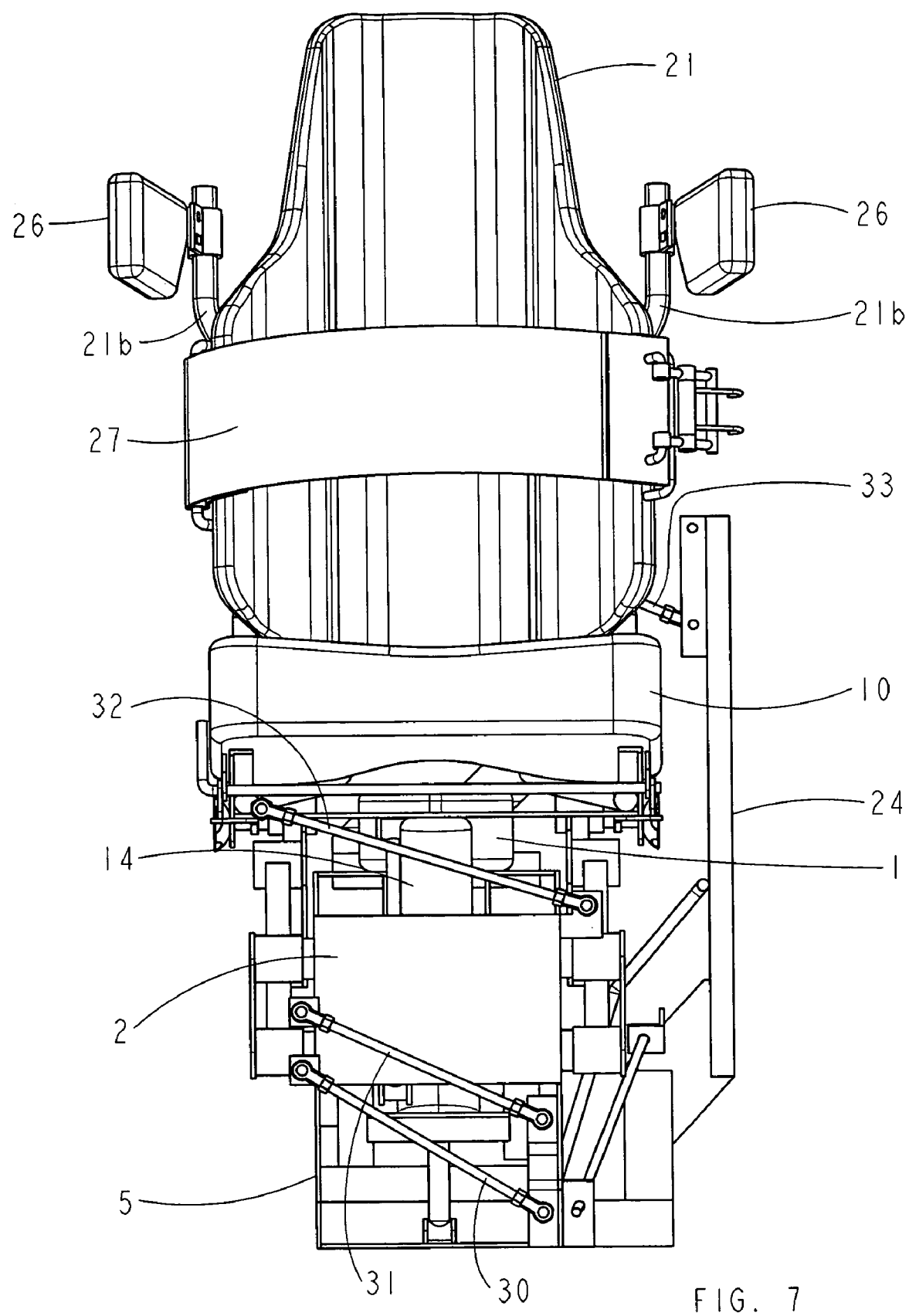
FIG. 7 is, in front elevation view, the seat of FIG. 6.
Figure 8:
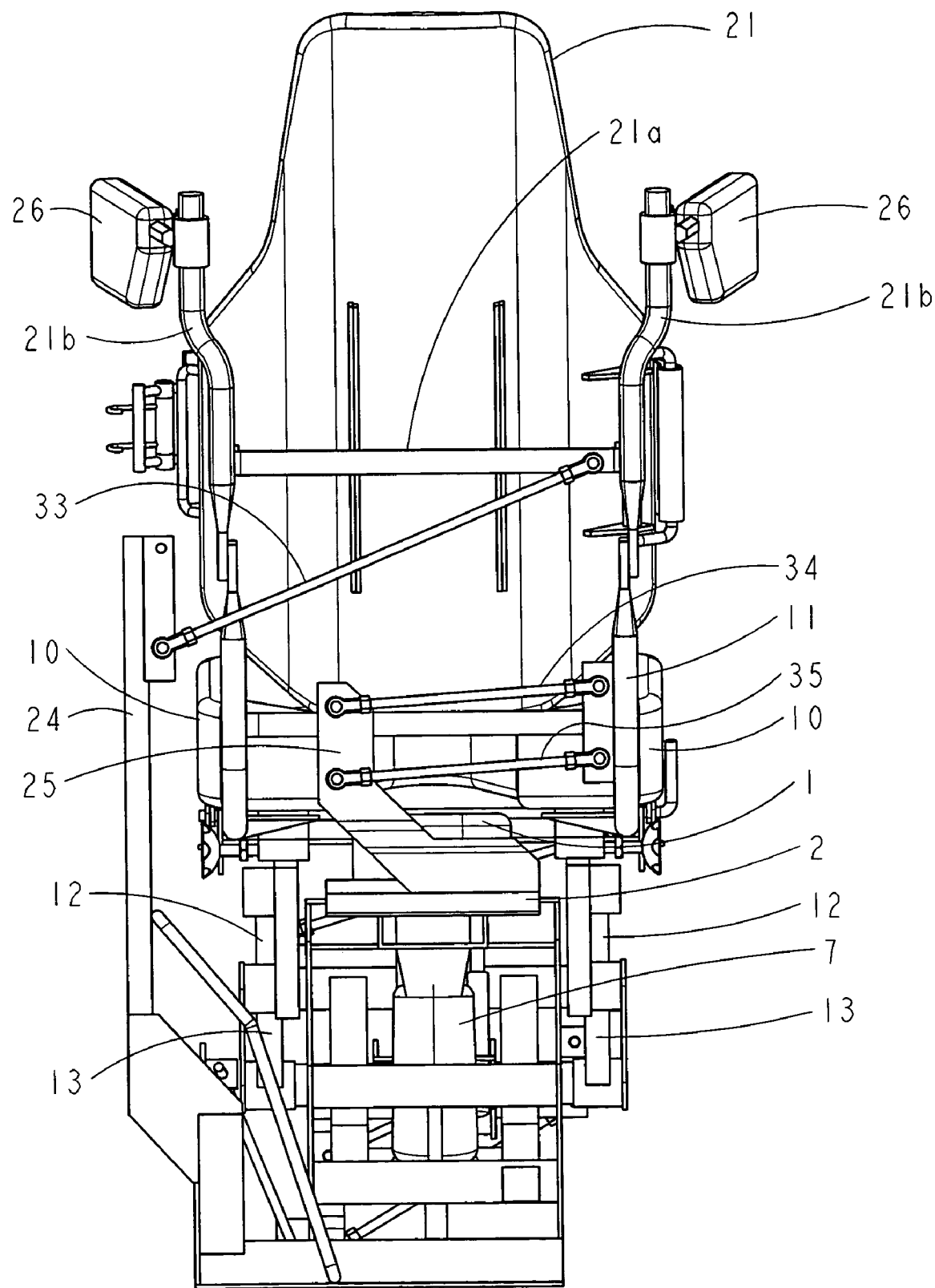
FIG. 8 is, in rear elevation view, the seat of FIG. 6.
Figure 9:
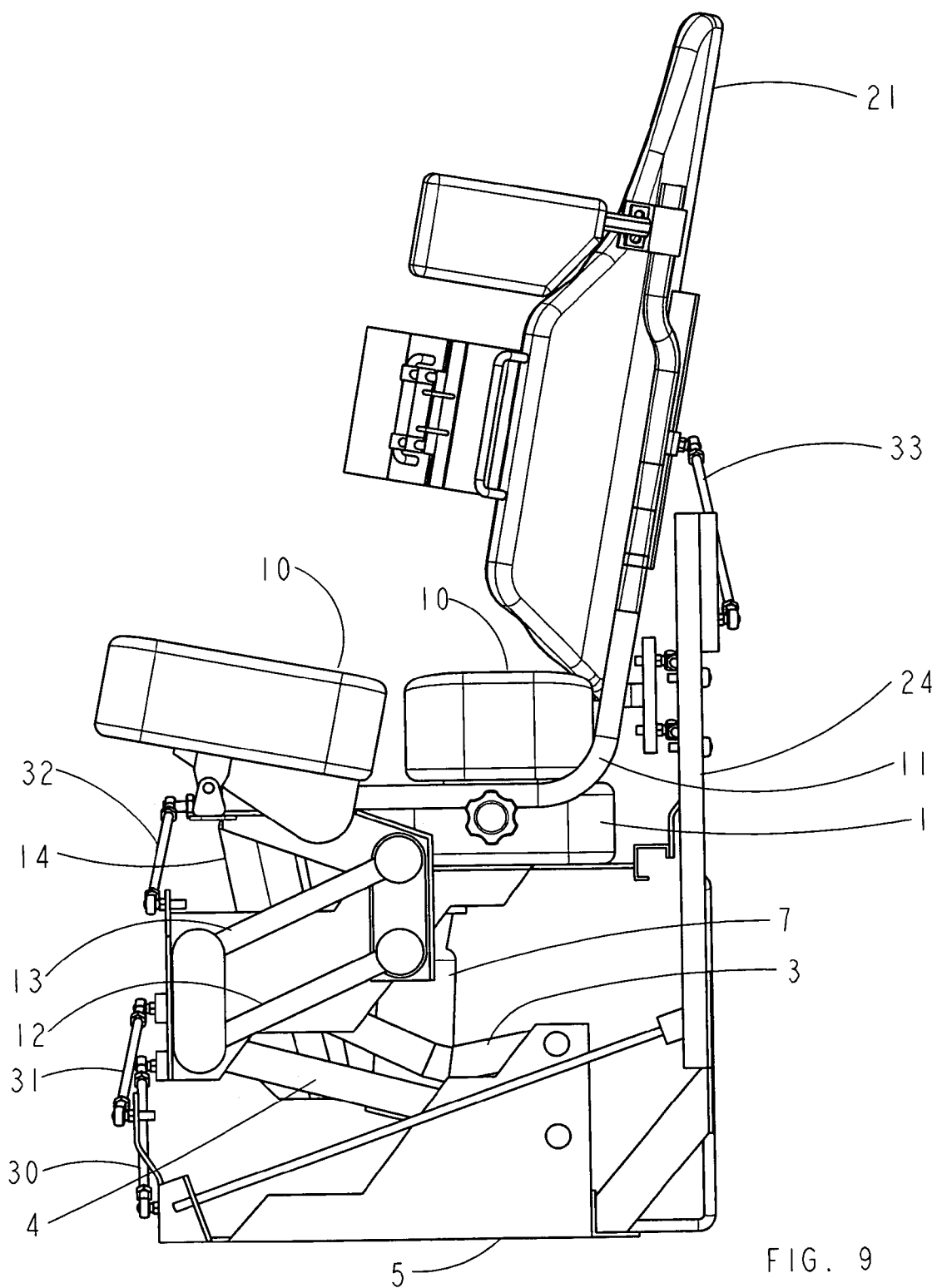
FIG. 9 is, in left side elevation view, the seat of FIG. 6.
Figure 10:
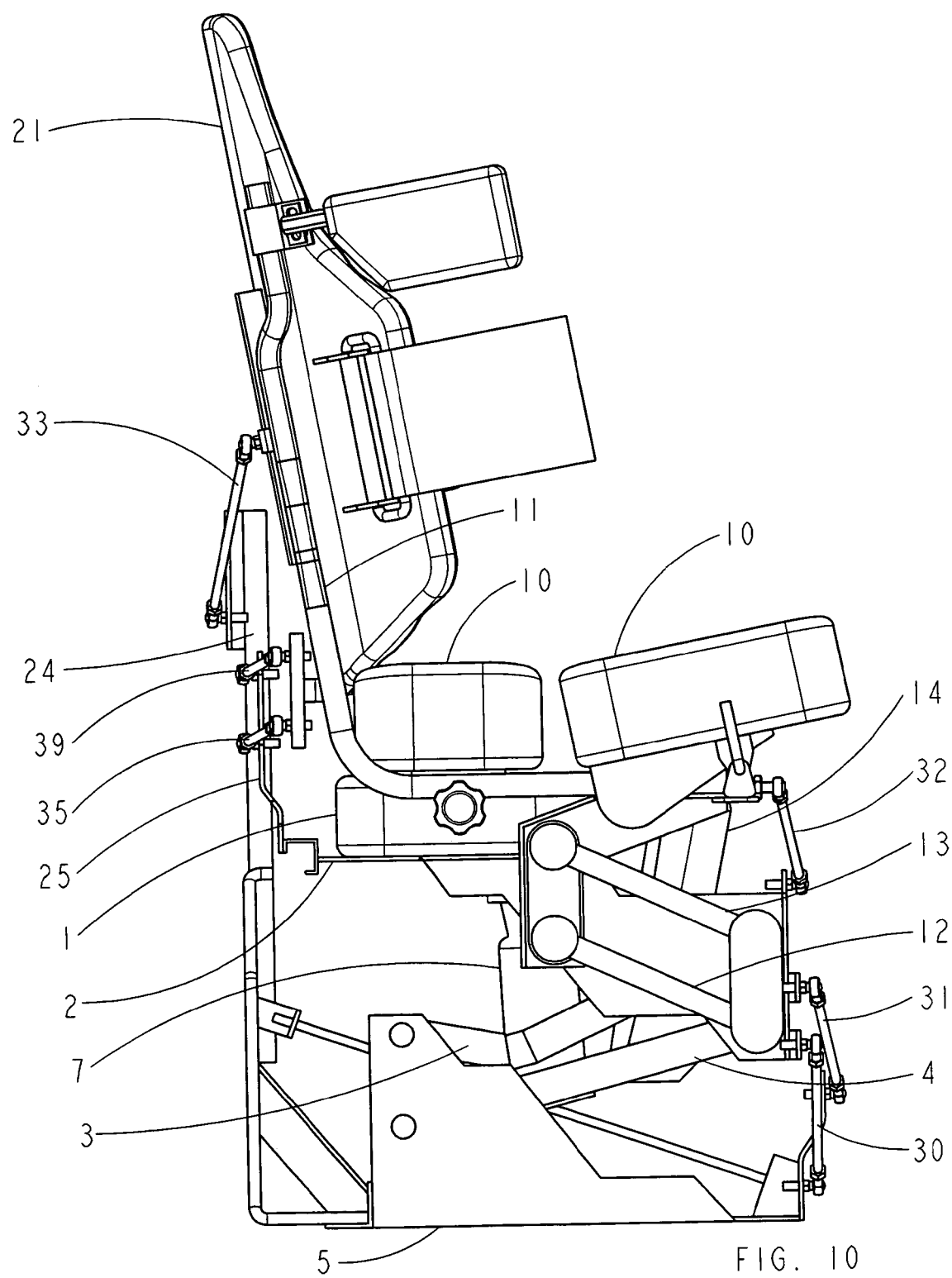
FIG. 10 is, in right side elevation view, the seat of FIG. 6.
Figure 11:
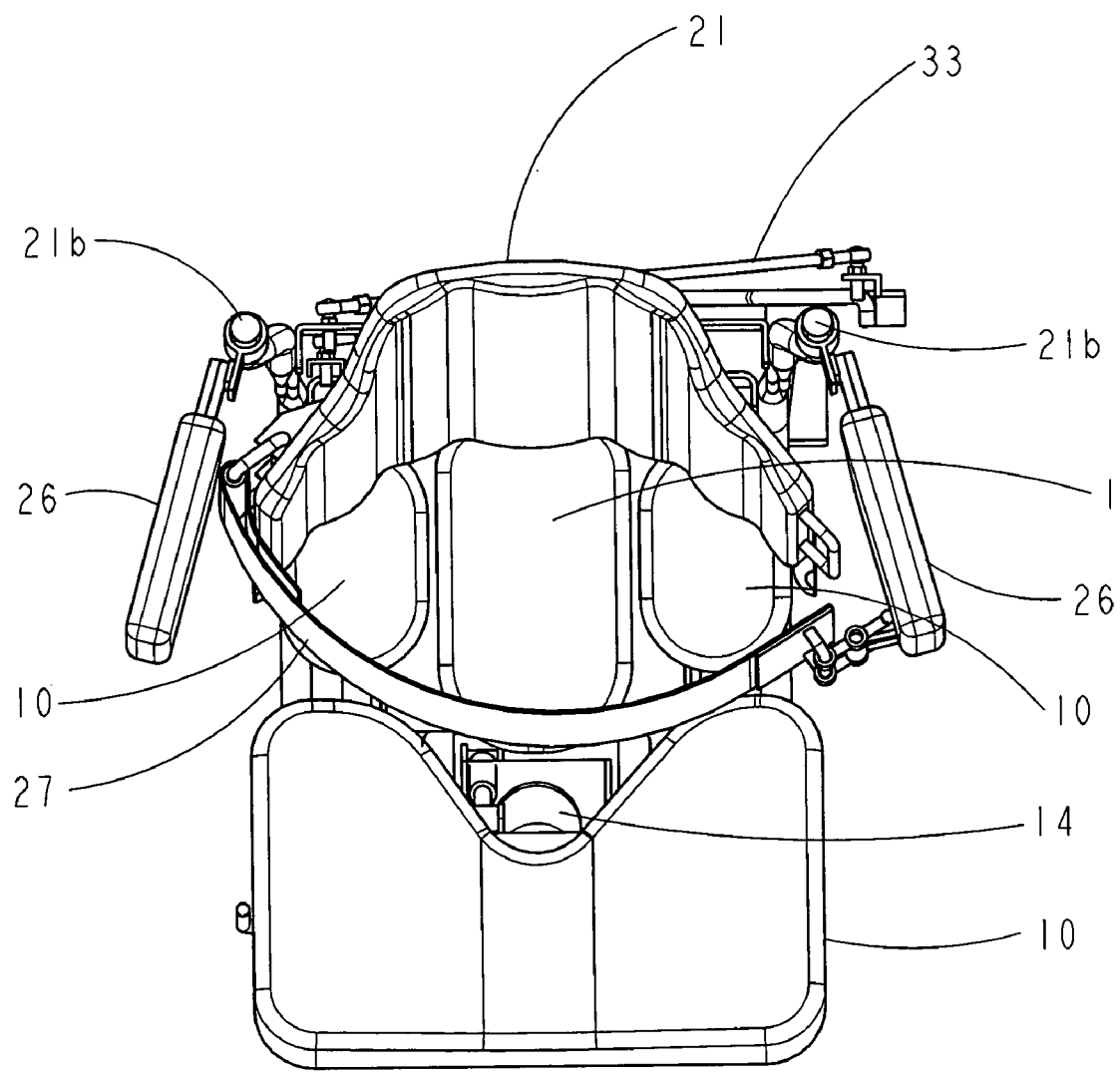
FIG. 11 is, in plan view, the seat of FIG. 6.

As best seen in FIGS. 1, 2 and 3, according to a preferred embodiment of the present invention, the inner seat cushion 1, shown in partially dotted outline in FIGS. 1 and 2, is mounted on a first sub-base 2. First sub-base 2 is suspended by being pivotally mounted to two pairs of lower parallel arms 3 and 4, wherein the pair of lower parallel arms 3 comprise a pair of arms of which only the near arm is visible as drawn, and wherein lower parallel arms 4 comprise a pair of arms of which only the near arm is visible as drawn, and wherein the lower two pair of parallel arms 3 and 4 are pivotally attached to a fixed base 5. Pins 6 permit free rotation of the lower parallel arms 3 and 4 in a vertical plane only, perpendicular to the pin 6 axis. A first air actuator 7 is mounted between the first sub-base 2 and the lower pair of parallel arms 4 so that air pressure, when admitted to the first air actuator 7 causes the first sub-base 2 to be lifted with respect to the base 5 as the force generated by the first air actuator acts through the first sub-base 2, the two pairs of lower parallel arms 3 and 4, and the base 5. Air supply to the first air actuator 7 is controlled by a manually operated first valve 8, and routed to the first air actuator 7 via tubing and fittings 9. Compressed air may be provided from an air brake system compressor, or from a separate compressor mounted in the vehicle, not shown in the drawings. An outer seat cushion 10 is pivotally attached to a second sub-base 11, which is suspended by pivotally mounted two pairs of upper parallel arms 12 and 13, wherein the pair of upper parallel arms 12 comprise a pair of arms of which only the near arm is visible as drawn, and wherein the two pair of upper parallel arms 12 and 13 are pivotally attached to the first sub-base 2. Pins 6 permit free rotation of the upper parallel arms 12 and 13 in a vertical plane only, perpendicular to the pin 6 axis. A second air actuator 14 is mounted between the second sub-base 11 and the first sub-base 2 so that air pressure, when admitted to the second air actuator 14 causes the second sub-base 11 to be lifted with respect to the first sub-base base 2 as the force generated by the second air actuator acts through the second sub-base 11, the two pairs of parallel arms 12 and 13, and the first sub-base 2. Air supply to the second air actuator 14 is controlled by a manually operated second valve 15 via tubing and fittings 23.

In operation, the dual ride seat apparatus is lowered to an entry/exit position as depicted in FIG. 1, wherein the first air actuator 7 and the second air actuator 14 are in a substantially retracted state. When an occupant is seated, the occupant manually actuates valve 8 to cause air to be supplied to the first air actuator 7. As the first air actuator 7 extends, the first sub-base 2 is caused to raise, and consequently both the inner seat cushion 1 and the outer seat cushion 10 are raised together, as depicted in FIG. 2. When the occupant of the seat chooses to increase the support to the occupant's thighs and outer buttocks, the occupant manually actuates valve 15 to cause air to be supplied to the second air actuator 14. As the second air actuator 14 extends, the second sub-base 11 is caused to raise, and consequently the outer seat cushion 10 is raised with respect to the first sub-base 2, as depicted in FIG. 3. To summarize the operation of the seat, the first valve 8 controls the overall ride height of the dual ride seat, while the second valve 15 controls the distribution of support of the occupant's body, between the inner seat cushion 1 and the outer seat cushion 10. The outer seat cushion 10 is mounted on a sub-plate 16, which is pivotally attached to the second sub-base 11 by pins 17 so that the sub-plate 16 may rotate in a vertical plane parallel with the plane of rotation of the pairs of parallel arms 3, 4, 11, and 12. Sub-plate 16 is supported at the opposite end from the pins 17 by a multi-faced cam 18. Cam 18 is supported by bearings 19 which are mounted on the second sub-base 11. A crank arm 20 is connected to cam 18 so as to permit the occupant of the seat to rotate the cam 18 thereby incrementally changing the angle of the sub-plate 16 with respect to the sub-base 11. Seat back 21 is attached to the second sub-base 11 by attaching means commonly used in commercial seat construction. A damping device 22 such as a commercial shock absorber is attached between the second sub-base 11 and the base 5 to damp out oscillations, which would occur due to the spring nature of the first air actuator 7 and the second air actuator 14. A similar second damping device, not shown in the drawings, may be applied similarly between the base 5 and the first sub-base 2 so as to increase the total damping effect.

In a second preferred embodiment of the present invention, not shown in the drawings, all elements remain as described in the first preferred embodiment, with the exception of the positioning of the second air actuator 14 and the pairs of upper parallel arms 12 and 13. The second air actuator is mounted so as to act between the second sub-base 11 and the base 5. The second sub-base 11 is suspended by pivotally mounted two pairs of upper parallel arms 12 and 13, and the two pairs of upper parallel arms are pivotally attached to the base 5. In this second preferred embodiment, the inner seat cushion 1 and the outer seat cushion 10 are manually adjusted completely independently. The air actuators 7 and 14 do not act in tandem, and the overall ride height is adjusted by the operation of both valves 8 and 15. An advantage of this second embodiment is the possibility of reducing the overall height of the seat in its lowest position.

In the embodiments of FIGS. 6–11, the chair is laterally stabilized by pivotally mounted cross-struts. In particular, cross-struts 30–35 are pivotally mounted between, respectively: fixed base 5 and first sub-base 2 for cross-struts 30 and 31; first sub-base 2 and second sub-base 11 for cross-strut 32; fixed base vertical frame member 24 and seat back frame 21a for cross-strut 33; and, first sub-base vertical frame member 25 and second sub-base 11. Vertical frame members 24 and 25 are rigidly mounted to fixed base 5 and first sub-base 2 respectively. Shoulder supports 26 and support back 27 are pivotally mounted to vertical supports 21b rigidly mounted to frame 21a.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A dual ride seat apparatus two-part seat assembly comprising:
   (a) an inner seat disposed for supporting a lower spine and adjacent inner buttocks region of a user sitting in the vehicle seat,
   (b) an outer seat having a generally U-shape and mounted so as to surround said inner seat, disposed so as to support thighs and outer buttocks region of the user,
   (c) means mounted to said inner seat for selectively raising and lowering said inner seat,
   (d) means mounted to said outer seat for selectively raising and lowering said outer seat,
   (e) horizontal stabilizing means for horizontally stabilizing vertical movement of said inner seat,
   (f) horizontal stabilizing means for horizontally stabilizing vertical movement of said outer seat,
   (g) control means, cooperating with said means mounted to said inner seat for selectively raising and lowering said inner seat, for controlling the vertical position of said inner seat,
   (h) a control means, cooperating with said means mounted to said outer seat for selectively raising and lowering said outer seat, for controlling the vertical position of said outer seat,
   (i) a support base, support means mounted to said support base for supporting said means mounted to said inner seat and said means mounted to said outer seat for selectively raising and lowering said inner and outer seats respectively,
   (j) an adjusting means for adjusting a pivot angle of an outer sub-plate,
   wherein said means mounted to said inner and outer seats for selectively raising and lowering said inner and outer seats respectively provides a pair of resilient means acting in tandem to resiliently support said inner and outer seats,
   wherein said inner and outer seats are mounted on inner and outer sub-plates respectively and wherein said outer sub-plate is pivotally mounted to an outer seat platform, and wherein said pivot angle of said outer sub-plate is adjusted by said adjusting means.

2. The assembly of claim 1 wherein said outer seat includes a seat cushion having at least one inflatable bladder element.

3. The assembly of claim 1 wherein said adjusting means includes at least one cam mounted on a rotatable pivot shaft mounted to said outer seat platform.

4. The assembly of claim 3 wherein said at least one cam includes a cam having an array of flat faces thereon such that the adjustable sub-plate is supported by one flat face of said cam, and wherein each flat face of the array of flat faces of said cam provides for a different said pivot angle for said adjustable sub-plate.

5. The assembly of claim 1 further comprising an adjustable resilient support mounted to said inner seat, and wherein said adjustable resilient support includes an air actuator.

6. The assembly of claim 5 wherein said air actuator includes an air spring.

7. The assembly of claim 6 wherein the said air actuator is mounted so as to act between said support base and said inner seat such that said inner seat is raised with respect to said support base when said air actuator is extended.

8. The assembly of claim 1 including an adjustable resilient support for said outer seat which includes an air actuator.

9. The assembly of claim 8 wherein said air actuator includes an air spring.

10. The assembly of claim 8 wherein said air actuator is mounted so as to act between said inner seat and said outer seat such that said outer seat is raised with respect to the inner seat when said air actuator is extended.

11. The assembly of claim 8 wherein said air actuator is mounted so as to act between said support base and said outer seat such that said outer seat is raised with respect to said support base when said air actuator is extended.

12. The assembly of claim 1 wherein a resiliently damping shock absorber is mounted so as to act between said support base and said outer seat.

13. The assembly of claim 12 wherein a resiliently damping absorber is mounted so as to act between said support base and said inner seat.

14. The assembly of claim 1 wherein said horizontal stabilizing means for horizontally stabilizing vertical movement of said inner seat comprises a parallelogram linkage of pivotally mounted arms so as to allow the inner seat to remain substantially horizontal as it moves in an arc determined by the pivoting of said parallelogram, and wherein a first end of said parallelogram is pivotally mounted to said support base, and wherein an opposite second end of said parallelogram is pivotally mounted to said inner seat.

15. The assembly of claim 1 wherein said horizontal stabilizing means for horizontally stabilizing vertical movement of said outer seat comprises a parallelogram linkage of pivotaily mounted arms so as to allow said outer seat to remain substantially horizontal as it moves in an arc determined by the pivoting of said parallelogram, and wherein a first end of said parallelogram is pivotally mounted to said outer seat, and wherein an opposite second end of said parallelogram is pivotaily mounted to said inner seat.

16. The assembly of claim 1 wherein said stabilizing device comprises a parallelogram linkage of pivotally mounted arms so as to allow said outer seat to remain substantially horizontal as it moves in an arc determined by the pivoting of said parallelogram, and wherein a first end of said parallelogram arm is pivotally mounted to the outer seat, and wherein an opposite second end of each parallelogram is pivotally mounted to the support base.

17. The assembly of claim 1 wherein said control means for controlling the vertical position of said inner seat is pneumatic.

18. The assembly of claim 1 wherein said control means for controlling the vertical position of said outer seat is pneumatic.

19. The assembly of claim 1 wherein said inner seat includes a seat cushion having at least one inflatable bladder element.

* * * * *